UNITED STATES PATENT OFFICE

ARTHUR BIDDLE, OF TRENTON, NEW JERSEY, ASSIGNOR TO UNITED PRODUCTS CORPORATION OF AMERICA, A CORPORATION OF DELAWARE

WATER-RESISTING ADHESIVE COMPOSITION OF MATTER

No Drawing.     Application filed July 21, 1927. Serial No. 207,576.

This invention relates to normally water-resisting, inaqueous flexible gummy colloidal materials treated with an alkaline earth hydroxide and a water-soluble metallic base caustic alkali, with the additional treatment of a water-absorbing or water-miscible or hydrophillic colloid.

I have found in the dispersing and the treating of artificial or natural dispersions of water-resisting and normally inaqueous colloidal flexible gummy substances, soluble in organic solvents, with an alkaline earth hydroxide and a water-soluble metallic base caustic alkali (or if the inaqueous colloid be treated with a normally water-soluble or water-miscible colloid that has been subjected to the action of an alkaline earth hydroxide in the presence of a metallic base caustic alkali, like sodium or potassium hydroxide), that the dispersion of the inaqueous gummy colloidal substance is more stable and the hydrophillic colloid or other water-miscible colloid so treated will add many desirable qualities to the aqueous dispersion.

The water-resisting or normally inaqueous flexible gummy colloids as meant herein are such as chicle or chicle substitutes, balata, gutta-percha, rubber or rubber containing substances either natural or synthetic and they may be in their crude, solid, gummy or liquid state. The inaqueous substances if solid may in the course of treatment with the water-absorbing colloid be aqueously dispersed. This may be brought about by first dissolving the water-insoluble gum in an organic solvent such as gasolene, kerosene, benzol, xylol or heavier oils and then aqueously dispersing the organic solution so made by adding thereto a water-miscible colloid in its natural state or treated with an alkaline earth hydroxide and a metallic base caustic alkali or other treatment. The aqueous dispersion of the water-insoluble gum colloid may also be brought about by masticating the same through rolls in the presence of a dispersing medium and water. Or if obtainable the water-insoluble and inaqueous gummy colloids may be used or treated in their natural aqueously dispersed or latex state. A good example of this is natural rubber latex in its pure, preserved, thickened or otherwise treated condition. Said latex generally being sold in commerce with about 3% of ammonia added thereto to preserve same.

By alkaline earth hydroxides are meant the hydroxides of such as calcium, barium, strontium or magnesium, but more particularly of calcium. Calcium hydroxide appears to give the best results when a fluid and strong glue-like substance is desired. The oxides of such substances are meant to be within the scope of my invention, as the oxides thereof when used in the presence of water will generally be changed to hydroxides. Further, the oxides or hydroxides as disclosed may be the natural earthy substances or they may be the product of chemical processes, as for instance, the precipitation of calcium hydroxide from other calcium compounds. The alkaline calcium hydroxides as derived from calcined marine shells and bony materials may also be advantageously utilized in my invention.

If the normally water-resisting and inaqueous colloids tend to be unstable when certain incompatible substances are added to their aqueous dispersions or if a more economical and stronger adhesive substance is desired, a hydrophillic colloid like casein, animal glue or marine glue, starches, particularly cassava starch, and starch degradation products, blood or blood albumen may be added in a treated or untreated condition to the water-insoluble colloid in aqueous dispersion or in solid gum form and then dispersed. The alkaline earth and the metallic base caustic alkali may be added either to the dispersion, or to its various ingredients, however as the alkaline earth hydroxides have a tendency to act somewhat quickly with certain colloids like casein and starch it is preferable to first add the metallic base caustic alkali to the components of the dispersion, or to add the earthy hydroxide and the water-soluble metallic base alkali simultaneously to the dispersion or the components thereof.

Many colloidal materials while not producing as strong an adhesive composition, as casein for example, will add or give adhesive, supporting and other qualities to the dispersion. Of these colloidal and supporting materials might be mentioned, water-soluble oils like Turkey red oil, wool-grease, soaps, water-soluble gums like karaya, arabic or tragacanth or Irish moss. Clays may be used in my composition, but in order to prevent undue thickening or coagulation they should first be mixed with water-soluble colloids like casein, glue or albumen. Water-soluble silicates such as sodium silicate may be added to the aqueous dispersion or parts thereof before dispersing, but in so doing care should be taken to avoid coagulation, precipitation or curdling of the aqueous dispersion or of its ingredients. If this coagulation is undesirable it may be avoided by first making the dispersion with the aid of a water-soluble colloid that is compatible to the other ingredients of dispersion and also to the silicate solution. Such water-soluble colloids are casein, glue, or starch, preferably in an alkaline condition as acid substances tend to precipitate insoluble silicates from the composition.

The water-soluble metallic base caustic alkali is meant to be such as sodium or potassium hydroxide. It is to be understood that other metallic base and caustic water-soluble alkalies may be also utilized. Further, the oxides and peroxides of such as sodium or potassium may also be used as the oxides or peroxides of sodium or potassium will become hydroxides on the addition of water thereto. Also the metallic base and water-soluble caustic alkalies may be combined with other chemicals to form caustic double compounds such as the combining of compounds of hydrofluoric, phosphoric or boric acid with caustic soda or potash.

Although some aqueous dispersions may have or possess little or no adhesive in their aqueous state, they will nevertheless act as binding mediums in their dry or dehydrated state. Which is entirely within the meaning of "adhesive," whether it be a strong water-resisting glue or a simple surface size or coating or the base of a plastic mass alone or as the vehicle of other or filling materials.

The following example of my invention will be given as a guide when a glue is made for wood working and for the making of laminated articles:

| | Parts by weight |
|---|---|
| Casein (commercial) | 100 |
| Calcium hydroxide | 20 |
| Caustic soda | 11 |
| Water | 300 |

The above ingredients are mixed (it is preferable to first soak the casein in the water) and the calcium hydroxide and the sodium hydroxide dissolves the casein. The mixture is then combined with:

Rubber latex (approximately 37%, rubber content) 100 parts by weight.

The above composition makes a strong but somewhat caustic glue. By reducing the amount of sodium hydroxide and substituting other chemicals a milder glue will be produced, which may be as follows:

| | Parts by weight |
|---|---|
| Casein | 100 |
| Calcium hydroxide | 15 |
| Magnesium oxide | 5 |
| Potassium hydroxide | 2 |
| Sodium borate | 12 |
| Sodium silicate (about 40% solids) | 50 |
| Sodium sesqui carbonate | 4 |
| Water (room temperature) | 260 |

In the above example the sodium silicate and the sodium sesqui carbonate are preferably mixed together and the casein dissolved in the water and the other ingredients. About 5 parts of sodium chloride will tend to make the lime more soluble and the addition thereto of a preserving agent such as sodium formate or other preservatives will be beneficial to the composition. The casein and other dry ingredients may be packed separately and later dissolved and added to the inaqueous colloid in aqueous dispersion. A few percent of terpeneol or cedar oil will help to preserve the composition as well as give it a scent. After the casein is dissolved and the silicate mixed therewith the composition may then be combined with:

Rubber latex, 200 parts by weight.

Another example of my composition which may be advantageously used as an adhesive sizing is as follows:

| | Parts by weight |
|---|---|
| Cassava starch | 50 |
| Dextrine | 50 |
| Animal glue | 50 |
| Casein | 10 |
| Calcium hydroxide | 20 |
| Sodium hydroxide | 5 |
| Water (preferably at room heat) | 600 |

The casein may be eliminated as it is only added to give strength to the composition and if used it is preferable to dissolve it first in an alkali or as given in previous examples. The above composition is then mixed with:

| | Parts by weight |
|---|---|
| Chicle substitute | 50 |
| Rosin | 150 |

The above inaqueous colloids may be dissolved in a volatile oil, which oil may be removed after dispersion with the water-soluble colloids. If the inaqueous colloids are dissolved in oils like linseed, China wood or non-drying oil, the amount of such oil is dependent on the result desired in the finished. The inaqueous oily solution is then added to the water-soluble colloids and dispersed therein. If a more flexible composition is desired, 100 parts by weight of rubber in an oily solution or in aqueous dispersion may be added to the foregoing composition. If the composition containing rubber is to be vulcanized a sulphur or sulphur compounds and accelerating agents may be added to the composition or if the composition is made into thin sheets with filling material added thereto, the various cold vulcanizing process may be utilized.

The examples given are to be used only as guides. For the season, climate or temperature of the working conditions all have an effect on the compositions. In hot climates the compositions generally require more of the caustic alkalies. The proportions of various ingredients may in some instances be doubled or tripled in order to overcome difficulties such as acidity of ingredients, expense of operation, climate and many other causes.

When the water-soluble colloids are to be in compositions that will be in damp places or around water it is then desirable that those colloids be treated to an insolubilizing or a water-irreversibilizing agent. These agents may be added to the various ingredients of the composition or to the composition as a whole. Colloids like bentonite clay, water-soluble oils and others are not as a rule known as insolubilizable colloids, although the water-soluble oils do sometimes revert to their original non-aqueous oily condition and may thereby be somewhat irreversibilized. Among these insolubilizing agents are formaldehyde, paraformaldehyde, hexamethylenetetramine, calcium, zinc and copper chlorides, potassium or sodium chromates, alums, tannic acid or compounds of tannic acid, also the many acid salts like sodium acid sulphate or zinc sulphate.

In the example given only the basic adhesive compositions are given, but in every art and industry there are countless filling, coloring agents and materials that may be added to my composition to satisfy known and definite needs of the art or industry, but which addition does not in the least require further inventive research if the amounts and properties are known to the art. Of these materials will be mentioned, carbon and other blacks, zinc oxide, the carbonates and stearates of sodium, calcium, magnesium etc. Or fibrous material like cotton, cellulose, shredded or ground wood, cork or leather. Oils like linseed, China wood, cotton seed oil, waxes, resins and the like. The addition of such materials are generally necessary when the composition is used as the adhesive vehicle of a sizing or coating or in the gluing of rough wood.

While I have herein described some particular compositions embodying my invention and methods of producing the same, and also mentioned some of the arts in which my invention may be utilized, it is to be understood that the invention is not limited to those arts, or to the methods or precise ingredients or proportions mentioned.

Having thus described my invention, I claim and desire to protect by Letters Patent of the United States:

1. An adhesive composition comprising rubber latex, casein, calcium hydroxide and sodium hydroxide.

2. An adhesive composition comprising rubber latex, one hundred parts; casein, twenty to three hundred parts; calcium hydroxide, five to three hundred parts; sodium hydroxide, two to fifty parts, water to dissolve.

3. An adhesive composition comprising rubber latex, casein, calcium hydroxide and a formaldehyde substance and a water-soluble metallic base caustic hydroxide.

4. An adhesive composition comprising rubber latex, casein, calcium hydroxide, sodium hydroxide, sodium fluoride and a carbonate of sodium.

In witness whereof I hereunto set my hand this 19th day of July, 1927.

ARTHUR BIDDLE.